Dec. 29, 1936.   J. TJAARDA   2,066,021
INSTRUMENT PANEL
Original Filed Nov. 8, 1933
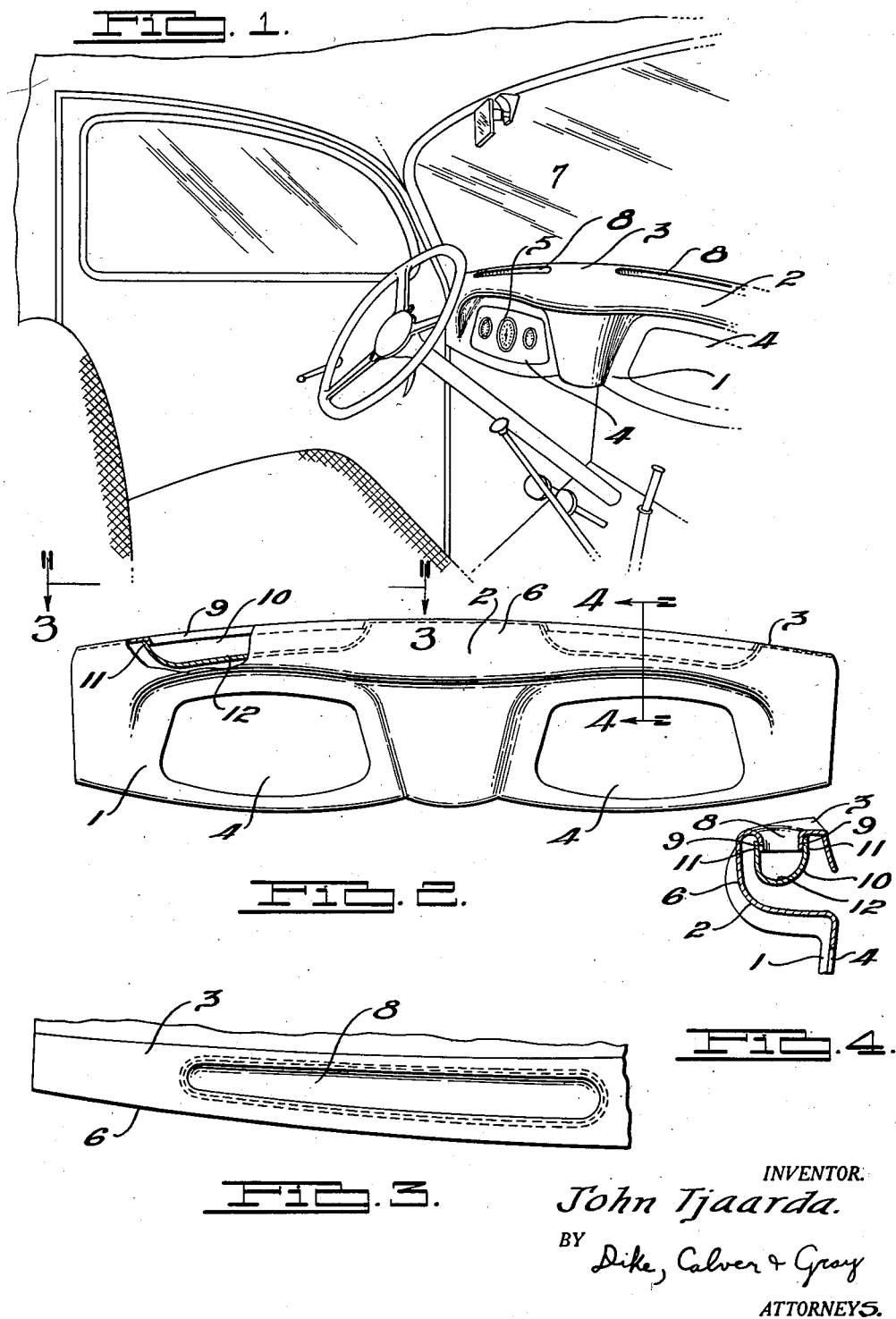
INVENTOR.
John Tjaarda.
BY Dike, Calver & Gray
ATTORNEYS.

Patented Dec. 29, 1936

2,066,021

UNITED STATES PATENT OFFICE 2,066,021

INSTRUMENT PANEL

John Tjaarda, Birmingham, Mich., assignor to Briggs Manufacturing Company, Detroit, Mich., a corporation of Michigan Original application November 8, 1933, Serial No. 697,115. Divided and this application October 23, 1935, Serial No. 46,295

12 Claims. (Cl. 180—90)

This invention relates to automobile or vehicle bodies and more particularly to the instrument or front interior panel thereof, an object of the invention being to provide an attractive and novel front or instrument panel having means forming a part thereof adapted to provide a hand grip whereby front seat passengers may assist themselves into and out of their seats.

A further object of the invention is to provide, on the front finish or instrument panel of the body, a handle or grip located within convenient reach of the front seat passengers when seated in the body as well as when entering or leaving the same, the grip being formed or positioned directly in the instrument panel or in the belt bar extending transversely below the windshield opening.

Other objects and advantages of the invention will appear from the following description when taken in conjunction with the accompanying drawing and the novel features thereof will be pointed out and clearly defined in the claims at the close of this specification.

This application is a division of my co-pending application, Serial No. 697,115, filed November 8, 1933.

Other objects of this invention will appear in the following description and appended claims, reference being had to the accompanying drawing forming a part of this specification wherein like reference characters designate corresponding parts in the several views.

In the drawing:

Fig. 1 is a perspective view of the front portion of the interior of an automobile body showing the novel instrument panel in position.

Fig. 2 is an elevation of the instrument panel shown in Fig. 1.

Fig. 3 is a partial plan view taken on the line 3—3 of Fig. 2 in the direction of the arrows.

Fig. 4 is a vertical section taken on the line 4—4 of Fig. 2 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The form of the invention illustrated in the accompanying drawing comprises an instrument panel 1 surmounted by a rearwardly offset or bulged belt panel 2 extending across the car and having its top formed into an approximately horizontal ledge 3. The panel portions 2 and 3 may be formed as separate stampings or, as in the present instance, may be pressed from a single sheet metal blank. The instrument panel, which is under the bulge and offset forward therefrom, is provided with a pair of openings 4 which are adapted to receive instruments 5 or to provide access to storage compartments. The ledge 3, forming the upper surface of the bulge 2, extends forwardly from the face 6 thereof substantially to the windshield 7. The ledge 3 is provided with two slots 8, one at each side of the longitudinal center of the body, these slots forming the openings of elongated finger wells. The sides of each of these wells are formed partly by circumferential depending flanges 9 which extend from the ledge 3 into the clearance space produced forwardly of the bulge or offset 2. Elongated cup-shaped or trough-like members 10 form the remainder of the sides and the bottoms of the finger wells, the upper edges 11 of the cup-shaped members fitting around and being welded to the depending flanges 9. The bottoms 12 of the cup-shaped members are far enough below the ledge 3 forming the top of the panel portion 2 to allow a person to grasp the rear edge of the ledge 3 while permitting his fingers to extend at full length into the well.

From the foregoing it will be seen that I have provided an ornamental and useful instrument panel having hand grips which form a fixed part of the instrument panel and which are inconspicuous. These hand grips facilitate getting into and out of vehicles and are especially useful with the seats in vogue at the present time.

I claim:

1. In a vehicle body, a transverse member located in the rear of and adjacent the windshield and associated with the instrument panel, said member having a horizontal portion vertically slotted, located above the instrument panel, and forming a hand grip portion.

2. In a vehicle body having a front end including side pillars defining a windshield opening, a panel extending transversely between said pillars in the rear of the windshield and having a horizontal portion vertically slotted to provide hand grips.

3. In a vehicle body having a front end including side pillars defining a windshield opening, a panel extending transversely between said pillars in the rear of the windshield and having an integral horizontal portion vertically slotted to provide a hand grip.

4. In a vehicle body having a front end including side pillars defining a windshield opening, a panel extending transversely between said pillars in the rear of the windshield and having an upper horizontal transverse ledge having a well providing a hand grip.

5. A sheet metal motor vehicle body panel comprising a substantiallly vertical instrument panel and an approximately horizontal ledge extending across above said instrument panel and integral therewith, said ledge having depending wells formed in its surface, at least part of the walls of the wells being integral with the shelf.

6. In an automobile body, a transverse interior finish panel at the front end of the body having spaced integrally formed hand grip means disposed longitudinally of the panel at its upper edge.

7. In a motor vehicle, an interior body panel having a space intended to receive instruments, a bulge extending across said panel above said space and having an upper horizontal surface provided with a recess adapted to receive the fingers of a hand grasping the upper edge of the bulge.

8. An instrument panel for a motor vehicle, comprising a panel formed from a sheet metal stamping and having an embossed portion extending across said panel, said embossed portion having spaced depressions formed in its upper surface providing hand grip means.

9. A sheet metal motor vehicle panel comprising a main portion having a space intended to receive instruments and a bulge extending across the panel above said space and having an upper horizontal surface provided with a downwardly flanged elongated opening near the face of the bulge and a trough-like sheet metal member within said bulge having its upper edge surrounding said depending flange and welded thereto.

10. A sheet metal motor vehicle body panel comprising a substantially vertical instrument panel, an approximately horizontal ledge extending across above said instrument panel, said ledge having a slot formed therein surrounded by a depending flange, and a trough-like sheet metal member below said ledge having its upper edge surrounding said depending flange and welded thereto, said slot and trough-like member extending along said panel and being close enough to the face thereto to form hand grip means.

11. A body panel having an approximately vertical instrument bearing portion and a horizontal ledge above said instrument bearing portion, said ledge having a slot deep enough and near enough to the edge of said ledge to form a hand grip means.

12. In an automobile body, a sheet metal transverse interior finish panel at the front end of the body having a well formed therein providing integrally formed hand grip means at its upper edge.

JOHN TJAARDA.